Patented June 27, 1950

2,512,716

UNITED STATES PATENT OFFICE 2,512,716

OIL-WELL SEALING COMPOSITIONS

Robert P. Courtney, Bloomfield, N. J., assignor, by mesne assignments, to Union Carbide and Carbon Corporation, a corporation of New York No Drawing. Application September 28, 1946, Serial No. 700,155

5 Claims. (Cl. 260—29.3)

This invention relates to the art of plugging, sealing or consolidating formations of rock, sand, soil or the like to render them impervious, or at least materially less pervious, to fluids. It is more particularly concerned with improved impregnating and grouting compositions containing a hydraulic cement and a water-soluble, base-catalyzed hardenable phenol-aldehyde resin, and with improved methods of making such compositions. The invention also includes improved methods of impregnating, grouting, plugging, sealing or consolidating masses or bodies of rock, sand, soil, and the like which may be in a mineral or naturally occurring formation as, for instance, in the plugging, or sealing of oil wells, or mines, shafts, or other subsurface borings or tunnels, using the improved composition of this invention. In addition to the treatment of naturally occurring formations the invention is readily adaptable to variety of other uses which will be described.

Oil well casings fit loosely in the drilled well, and unless the space between the casing and the well is plugged or sealed, a space is left through which gas, water and brine from porous strata may flow into the well where they interfere with the withdrawal of oil. In some well drilling operations the flow of water, brine or gas is so great that further drilling towards a lower oil-bearing stratum is seriously impeded or prevented unless the flow is sealed off. On occasion the formation may contain loose sand and in such instances the problem is to consolidate or bond the sand as well as seal the pores against flow of fluid. The problem is further complicated by the occurrence of voids which must also be sealed or plugged.

To seal oil wells against the flow of water, gas or brine, and to consolidate loose formations, grouts consisting of water slurries of hydraulic cement have been widely used. Such grouts or slurries penetrate only shallowly into porous formations and adhere but poorly to the steel casing and to the formations. Grouts which contain, in admixture with the water slurry of hydraulic cement, a water-soluble resin-forming material of the phenol-aldehyde type have also been used. This resin-forming material has the very desirable properties of penetrating more deeply than the cement into the porous formation where it solidifies, and of adhering better than the cement both to the steel casing and to the formation. Because a hydraulic cement slurry is alkaline, phenol-aldehyde resin-forming materials which are base-catalyzed are used in the cement slurry mixtures, with the alkaline slurry serving to catalyze the hardening of the material.

Base-catalyzed resins of the hardenable phenol-aldehyde type possessing the requisite water-solubility for mixing with a water slurry of hydraulic cement are obtainable in various ways as the literature and patents explain, and are in general liquid resins of low viscosity and high water-solubility. The liquid resins are shipped and stored in aqueous solution with a resin solids content usually of about 60 to 75 per cent, by weight. Those liquid resins are as a rule unstable, and at normal room temperatures the viscosity increases and the solubility in water decreases until they set to an insoluble gel or solid state over a period measurable by days or weeks, as may occur during shipping and storing.

The cements commonly used for making slurries and grouts are the hydraulic cements, such as Portland and aluminous cements, produced by the sintering of lime-alumina-silica systems and containing di- and tri-calcium silicates and mono- and tri-calcium aluminates. These cements accelerate the hardening of phenolic resins. To illustrate, a base-catalyzed phenol-formaldehyde resin that gels in about 30 days on standing at room temperature (80° F.), for instance, was observed to gel immediately upon mixing in the proportion of 60 parts of the resin with a slurry of 100 parts of a Portland cement and 30 parts of water, by weight.

Prior to the present invention, attempts to employ base-catalyzed resins of the hardenable phenol-aldehyde type with water slurries of hydraulic cement met with difficulties which seriously impaired their usefulness in the sealing of oil wells. For instance, a resin which was sufficiently advanced to harden within a suitable time after being placed in a well did not yield a pumpable slurry on mixing with the water slurry of hydraulic cement. On the other hand, resins of high water solubility and sufficiently low viscosity to yield a pumpable slurry on mixing with water and hydraulic cement would harden so slowly in some wells as to be unsuitable. The situation was further complicated by the wide range of well temperatures encountered, with the highest temperatures usually being found in the deepest wells. Heating speeds the gelling and solidification of the resin, especially at temperatures of 130° to 160° F., and higher, and the longer the time that would be required for introducing the slurry, as in the deeper wells, the greater would be the acceleration of the hardening of the resin-cement slurry. A resin having a suitable pump time for a high temperature well would set too slowly in a low temperature well.

An immediate object of this invention is to provide a grout or slurry of water, hydraulic cement, and hardenable resin-forming material which will remain pumpable for at least three quarters of an hour and preferably longer, will harden or set up in no more than twenty-four hours, and when so hardened or set up will effectively plug the pores of the formation and will adhere well to metal and stone.

I have found that compositions of water-soluble base-catalyzed heat-hardening phenol-aldehyde resins and hydraulic cement slurries can be had which retain a flow, or freedom from objectionable gelling, suitable for pumping for a period of 0.75 to 8 hours and then set in location to hardened insoluble condition within 24 hours at temperatures as low as 27° C. (80° F.) and even somewhat lower. Such setting characteristics enable sealing operations in shallow "cold" wells.

These results are brought about, in accordance with this invention, by having present in the slurry of cement and resin at the time of use a proportion of free or unreacted formaldehyde which may be introduced in the form of the commercial aqueous solution, formalin, if desired. It is essential that the formaldehyde be added either to the resin or to the cement prior to the mixing of the resin with the hydraulic cement, and preferably just prior to such mixing. The proportion of free formaldehyde added should be 5 per cent or more of the weight of resin solids. The proportion can be as much more than 5% as is desired, increased percentages of free formaldehyde serving to delay longer the gelation of the resin. Normally, it will not be necessary or desirable to add more than 15% formaldehyde.

For instance, 60 parts by weight of a water-soluble, base-catalyzed, heat-hardening, phenol-aldehyde resin was mixed with 100 parts of cement, 4 parts of water, and 26 parts of formalin (37 per cent formaldehyde in water). The formaldehyde delayed gelation of the resin in the composition for 50 minutes, during which period the composition remained pourable without any resin separation, yet the whole set to a hardened solid state at room temperature (about 80° F.) in about 20 hours.

It would seem from this illustration that the formalin acts only temporarily as an inhibitor of the hardening, and after a time the cement slurry acts as a fast activator for the resin-hardening. The inhibiting of the hardening action by the aldehyde seems to be dependent on its presence in the free state in the composition of resin and cement slurry, and it may be that the inhibition continues until the formaldehyde has combined or disappeared. Further evidence in favor of this possible explanation is offered by the following experiment. A particularly green or freshly prepared base-catalyzed resin made by the partial reaction of phenol (one mol) and relatively large amounts of formaldehyde (two or more mols), when added to a cement slurry gives a pourable mix hardening to a solid in about 24 hours at a temperature as low as about 130° F. If such a resin is advanced by standing at room temperature and is thereafter added to a cement slurry, a resin separation or gelling occurs before the composition can be located in a well; but the addition of formaldehyde to such an advanced resin delays, to a useful extent, its gelling in cement slurries.

Other water-soluble resins of the phenol-aldehyde type, which likewise gel or set up in the presence of a cement slurry so rapidly as to be inoperable, are controlled or inhibited in a similar manner by the free formaldehyde inclusion. Useful resins include those prepared with aldehyde other than formaldehyde, such as acetaldehyde, etc. and their polymers or compounds that release aldehydes upon reaction with the phenols. In general, the resins at the time of mixing with the cement slurry have a pH of about 7.5 to 9.

The presence of free formaldehyde or other aldehydes at the time of mixing the aqueous resin solution and cement slurry has other advantages; for example, besides inhibiting the catalytic action of the cement on the resin, the aldehyde promotes a smooth mixing of resin and cement and acts in this manner over the range of mixing temperatures (50°–200° F.). Water-soluble aliphatic aldehydes having from two to six carbon atoms, including saturated aldehydes, such as acetaldehyde, butyraldehyde, furfural, and the like, are found to act similarly, though less effectively than formaldehyde. The polymers of formaldehyde and the other aldehydes can be substituted for the corresponding monomers. Aldehydes of the aromatic type do not appear to be useful.

The amount of water added to form the resin-cement slurry is customarily that which is required to make a pumpable slurry. For the setting of the cement the water content of the liquid resin in itself may be sufficient, but larger amounts may be used. However, there is an upper limit determined by the degree of water-dilutibility of the slurry and the necessity of avoiding precipitation. The water-dilutibility of the slurry varies inversely with the degree of advancement or aging of the resin and directly with the free formaldehyde content of the slurry.

The proportion of resin to cement should be not less than 40 parts of the former to 100 parts of the latter to insure against gelling and separation of the resin. In general, a proportion of about 40 to 100 parts of resin to 100 parts of cement has been found useful for penetrating into porous formations to effectively seal them. In the plugging or sealing of oil wells a proportion of about 60 to 80 parts of resin to 100 parts of cement has been found very satisfactory and is preferred.

In accordance with the invention, a series of resins were prepared by partially reacting 100 parts by weight of phenol with from about 150 to 180 parts of formalin (37 per cent aqueous formaldehyde) in the presence of a basic catalyst, for instance, sodium hydroxide. This ratio of from 150 to 180 parts of formalin (37%) per 100 parts of phenol corresponds to a ratio of from 55.5 to 66 parts of formaldehyde per 100 parts of phenol. The resins were dehydrated to solids contents of 60% to 75% and viscosities ranging from 520 to 1500 k. v. The resins had water dilutibilities ranging from about 20 water:1 resin down to 9 water:1 resin. When these resins were mixed with a Portland cement and water in the ratio in parts by weight of 60 resin to 100 cement to 30 water, all except that having a water dilutibility of 20:1 thickened excessively before all the cement could be added, and the said exception showed separation of resin within an hour. In the mixes the water was then replaced in part by formalin, and in every case useful slurries were obtained. Another resin, which had aged to the point where it would take only 20 per cent of water, made a satisfactory slurry when formalin was substituted for all of the water. A slurry was considered pumpable in ordinary oil well cement pumping equipment when its viscosity did not exceed 40 poises on a standard consistometer.

The effects obtained by varying the amounts of free formaldehyde on the "dump-time" and "set-time" of a resin-cement slurry mix is shown by the data given in the following table. The dump-time was that during which the slurry could be poured and the set-time was that for the setting of the slurry to a hard solid. The same resin and Portland cement were used throughout these tests.

Table

| | Parts by Weight | | | | | |
|---|---|---|---|---|---|---|
| Cement, Portland | 100 | 100 | 100 | 100 | 100 | 100 |
| Resin | 60 | 60 | 60 | 60 | 60 | 60 |
| Formalin (37%) | | 5 | 10 | 15 | 20 | |
| Water | 30 | 25 | 20 | 15 | 10 | 15 |
| Furfural | | | | | | 15 |
| Dump-time, hrs.: min. | | | | | | |
| At 50° F | | 1:30 | | | | |
| At 75° F | 0:22 | 1:00 | 2:10 | | | |
| At 100° F | 0:22 | | 2:10 | 4:30 | | |
| At 120° F | 0:22 | | 2:10 | 2:30 | | |
| At 140° F | 0:22 | | 1:50 | 1:30 | 1:45 | |
| At 160° F | | | | 0:50 | 0:45 | |
| At 180° F | | | | 0:35 | 0:35 | |
| Set-time, hrs.: min. | | | | | | |
| At 50° F | | <24:00 | | | | |
| At 75° F | 7:07 | <21:00 | <20:00 | | | |
| At 100° F | 5:04 | | <20:00 | <21:00 | | |
| At 120° F | 4:20 | | 7:00 | <21:00 | | 24:00 |
| At 140° F | 4:20 | | 4:10 | <16:00 | <20:00 | 18:00 |
| At 160° F | | | | 5:15 | 5:00 | <19:00 |
| At 180° F | | | | 5:15 | 5:00 | 1:35 |

Like results were obtained with a calcium aluminate cement substituted for Portland cement.

Grouts or slurries prepared according to this invention have performed successfully in full-scale practice in oil well work. The improved grouts may be used advantageously in analogous situations, for instance for grouting tunnels, dams, and mineshafts, or for consolidating loose sand, soil, and silt on the surface or underground. Furthermore, ornamental or structural rock, concrete, or cinder block may be treated by spraying, or brushing on the improved grout, or by applying the grout under pressure (with or without heating) either to the outer surface or through drilled or otherwise formed holes. For example, porous sandstone blocks were provided with drilled holes into which the improved grout was pumped under pressure. When the blocks were gently heated to set the resin, and subsequently cut open, it was found that a considerable portion of the blocks surrounding the holes were thoroughly impervious.

I claim:

1. A pourable, pumpable impregnating and grouting composition comprising water, hydraulic cement of the group consisting of Portland and aluminous cements, a water-soluble base-catalyzed hardenable resin made from phenol and formaldehyde in the ratio of about 55.5 to 66 parts of formaldehyde per 100 parts of phenol and free water-soluble lower aliphatic aldehyde having not more than six carbon atoms.

2. A pourable, pumpable impregnating and grouting composition composed of water, hydraulic cement of the group consisting of Portland and aluminous cements, a water-soluble base-catalyzed hardenable resin made from phenol and formaldehyde in the ratio of about 55.5 to 66 parts of formaldehyde per 100 parts of phenol and free formaldehyde, the proportion of the cement being greater than that of the resin, and the proportion of free formaldehyde being at least 5% of the resin.

3. An initially pourable, pumpable impregnating and grouting composition which becomes too viscous to pour within a period of three-quarters of an hour to eight hours and which hardens thereafter but within twenty-four hours, composed of water, hydraulic cement of the group consisting of Portland and aluminous cements, a water-soluble base-catalyzed hardenable resin made from phenol and formaldehyde in the ratio of about 55.5 to 66 parts of formaldehyde per 100 parts of phenol and free formaldehyde, the ratio of resin solids to cement being from 0.4 to 1.0, the weight of free formaldehyde being from 5% to 15% of the resin solids weight, and the water being sufficient to make a thin slurry.

4. Method of delaying the initial set of an aqueous slurry of hydraulic cement of the group consisting of Portland and aluminous cements and water-soluble base-catalyzed hardenable resin made from phenol and formaldehyde in the ratio of about 55.5 to 66 parts of formaldehyde per 100 parts of phenol which comprises adding thereto free water-soluble aliphatic aldehyde of not more than six carbon atoms.

5. Method of delaying the initial set of an aqueous slurry of hydraulic cement of the group consisting of Portland and aluminous cements and water-soluble base-catalyzed hardenable resin made from phenol and formaldehyde in the ratio of about 55.5 to 66 parts of formaldehyde per 100 parts of phenol which comprises adding thereto free formaldehyde in a proportion from 5% to 15% of the weight of the resin.

ROBERT P. COURTNEY.

REFERENCES CITED

The following references are of record in the file of this patent:

UNITED STATES PATENTS

| Number | Name | Date |
|---|---|---|
| 2,133,245 | Brice et al. | Oct. 11, 1938 |

FOREIGN PATENTS

| Number | Country | Date |
|---|---|---|
| 231,242 | Great Britain | Mar. 30, 1925 |

OTHER REFERENCES

Article by Delmonte, in Plastics, October 1945 (pages 40, 80–81).